United States Patent
Gupta (10) Patent No.: US 7,496,770 B2
(45) Date of Patent: Feb. 24, 2009

(54) POWER-EFFICIENT TECHNIQUE FOR INVOKING A CO-PROCESSOR

(75) Inventor: Vikram Gupta, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 463 days.

(21) Appl. No.: 11/241,032

(22) Filed: Sep. 30, 2005

(65) Prior Publication Data

US 2007/0079161 A1    Apr. 5, 2007

(51) Int. Cl.
*G06F 1/00*    (2006.01)
*G06F 1/32*    (2006.01)

(52) U.S. Cl. .................. 713/300; 713/320; 713/323
(58) Field of Classification Search .............. 713/300, 713/323, 320
See application file for complete search history.

(56) References Cited

U.S. PATENT DOCUMENTS

| | | | |
|---|---|---|---|
| 6,240,521 B1* | 5/2001 | Barber et al. | 713/323 |
| 6,279,048 B1* | 8/2001 | Fadavi-Ardekani et al. | 710/15 |
| 6,373,904 B1* | 4/2002 | Sakamoto et al. | 375/316 |
| 7,184,003 B2* | 2/2007 | Cupps et al. | 345/30 |
| 7,213,162 B2* | 5/2007 | Oshima et al. | 713/322 |
| 2002/0087225 A1* | 7/2002 | Howard | 700/94 |

* cited by examiner

*Primary Examiner*—Suresh K Suryawanshi
(74) *Attorney, Agent, or Firm*—Brake Hughes Bellermann LLP (57) ABSTRACT

Various embodiments are disclosed relating to power-efficient techniques for invoking a co-processor. In an example embodiment, a computer system may include a first processor (e.g., a host processor) and a second processor (e.g., a co-processor). The first processor may instruct the second processor to perform an operation repeatedly on a data stream. The first processor may be placed in a low power state. The second processor may perform the operation repeatedly on the data stream while the first processor remains in the low-power state.

19 Claims, 7 Drawing Sheets

POWER-EFFICIENT TECHNIQUE FOR INVOKING A CO-PROCESSOR

BACKGROUND

Computer systems commonly employ a host processor or central processing unit (CPU), memory, input/output (I/O) devices, and other devices. Advances in computer system technology have led to the development of computer systems that may include multiple processors to support additional and/or enhanced computing features. For example, in one type of computer system a co-processor may be used in conjunction with a host CPU to perform specific operations, such as, to perform complex mathematical operations, decompress compressed data, decode encoded data, perform graphics processing, process audio signals, etc. The co-processor may, for example, allow certain tasks or operations to be off-loaded from the host CPU while providing specialized hardware to more efficiently perform these tasks as compared to the host (e.g., general purpose) CPU.

Computer systems may include various platform devices (e.g., disk drive, media players, speakers, video output devices, cameras, headsets, and other peripheral components) which may operate with or under the control of a host central processing unit (CPU). During operation of the computer system, interrupts may be generated by these platform devices and transmitted to the CPU in order to communicate with the CPU. Other devices, internal to the computer system, may also generate interrupts Other advances in computer system technology have led to the development of battery-powered portable computers (e.g., laptop or notebook style computers, hand-held computers, cell phones, smart phones, personal digital assistants (PDA), headsets, music players, and video players, etc.) that are implemented with high-speed processors similar to those implemented in desktop computers. Some of these portable computers may also include multiple processors, such as co-processors. In order to conserve power in these systems, a processor in these systems may in some instances be placed in a low power state or sleep mode when not in active use.

SUMMARY

Various embodiments are disclosed relating to computer systems, and to power-efficient techniques for invoking a co-processor. In one implementation, a computer system may include a first processor (e.g., a host processor) and a second processor (e.g., a co-processor). The first processor may instruct the second processor to perform an operation repeatedly on a data stream. The first processor may be placed in a low power state. The second processor may perform the operation repeatedly on the data stream while the first processor remains in the low-power state.

According to another embodiment, a computer system may be provided that includes a memory, a first processor (e.g., a host processor) and a second processor (e.g., a co-processor). The first processor may be configured to instruct the second processor to repeatedly perform an operation on a data stream. The first processor may enter a low power state after instructing the second processor to repeatedly perform the operation.

According to another embodiment, an instruction may be received at a second processor from a first processor. The instruction may include a command field and an execution mode field. The execution mode field may specify one of a plurality of modes of execution including a regular mode indicating the instruction should be executed once, and a repeat mode indicating that the instruction may be executed repeatedly without further instructions from the first processor. The second processor may execute the instruction based on the execution mode field.

DETAILED DESCRIPTION

Figure 1:
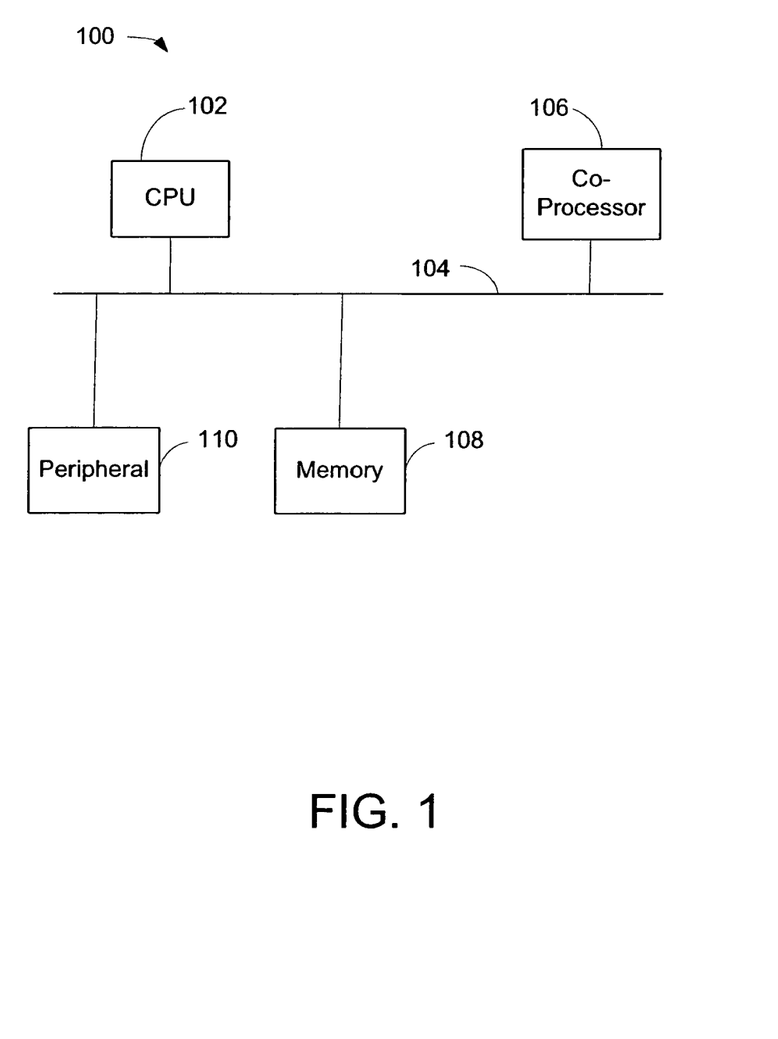
FIG. 1 is a block diagram of a computer system according to an example embodiment.

Referring to the Figures in which like numerals indicate like elements, FIG. 1 is a schematic block diagram of a low-power computer system 100 according to an example embodiment. A host processor (or CPU) 102 is coupled to a bus 104. A second processor (or co-processor) 104 and a memory 108 are also coupled to bus 104. A peripheral 10 may also be provided, and may, for example, store data in and retrieve data from memory 108. Host processor 102 may be any type of processor, such as, for example, a MIPS™ or ARM™ core processor, etc. Memory 106 may be any type of memory, such as random access memory (RAM), Flash memory, etc. Co-processor 106 may be any type of co-processor, such as, for example, a math co-processor, a graphics or media coprocessor, an audio or video co-processor, an encryption/decryption co-processor, a decoding co-processor, a wireless co-processor or communications co-processor, etc. According to an example embodiment, co-processor 106 may be, for example, hardware or a combination of hardware and/or software (or firmware) that may be adapted to perform specific operations, e.g., related to audio, video, decoding/encoding, mathematic, encryption/decryption or other type of data processing. These are just a few examples of co-processors that may be used, and the disclosure is not limited thereto.

According to an example embodiment, co-processor 106 may perform a variety of co-processor operations under control or guidance of host processor 102. Co-processor 106 may receive an instruction to perform an operation, such as to process data stored in memory 108 (e.g., decode the data stored in memory, and store the processed data back in memory 108), for example. In an example embodiment, host processor 102 may store data to be processed in memory 108. In another example embodiment, data may be stored in memory 108 by peripheral 110. Host processor 102 may then send co-processor 106 an instruction to process the data in memory, and host processor 102 may then be placed in a low power state (or sleep mode) to conserve power while co-processor processes the data. When co-processor 106 has completed processing of the data, co-processor 106 may send an interrupt to host processor 102 to inform processor 102 that co-processor 106 has completed the requested data processing. This process may repeat, e.g., as frames or packets of data in a stream arrive for processing: More data may arrive and may be stored in memory 108. Host processor 102 may again send an instruction to co-processor 106 to process the data, and then host processor 102 may enter a low power state until interrupted by co-processor 106. The instruction sent to the co-processor 106 may be the same or a similar instruction to request processing, e.g., decoding each frame of data as it arrives. Thus, after each operation is performed by co-processor 106, co-processor 106 may typically send an interrupt to processor 102, thereby waking up processor 102 from its low power state. Therefore, in one example embodiment, each instruction may of course be executed once upon receipt by co-processor 106. This mode may be referred to as a regular (or single) mode of execution.

According to an example embodiment, to improve power conservation and increase battery life, instead of host processor 102 continually waking up to send an instruction to co-processor 106 to perform an operation, the co-processor 106 may be instructed by host processor 102 to repeatedly perform an operation on a data stream. Thus, by instructing the co-processor to perform an operation (or execute an instruction) repeatedly, this may obviate the need to wake up the host processor each time co-processor may be instructed to perform an operation (e.g., each time another frame or packet arrives for processing by co-processor 106), and may allow host processor 102 to stay in a low power state for a longer period of time. This repeated execution of an instruction may be performed a specific number of times, for a specific period of time, until a specific event occurs, or may be performed indefinitely (e.g., until an error occurs), for example.

Therefore, according to an example embodiment, one or more instructions executed by co-processor 106 may have the capability of being executed or performed repeatedly (or multiple times) in response to the single instruction. This may be referred to as a repeat mode of execution. Thus, in an example embodiment, one or more instructions executed by co-processor 106 may be executed in one of two modes of execution, for example: 1) a regular (or single) mode in which an instruction may be executed once in response to the instruction (e.g., the operation indicated in the instruction may be performed once); and 2) a repeat mode in which the instruction may be repeatedly executed by the co-processor (e.g., the operation indicated in the instruction may be performed multiple times) in response to the one instruction, e.g., without further instruction or intervention required from host processor 102. In an example embodiment, the mode of execution may be indicated within each instruction.

Figure 2:
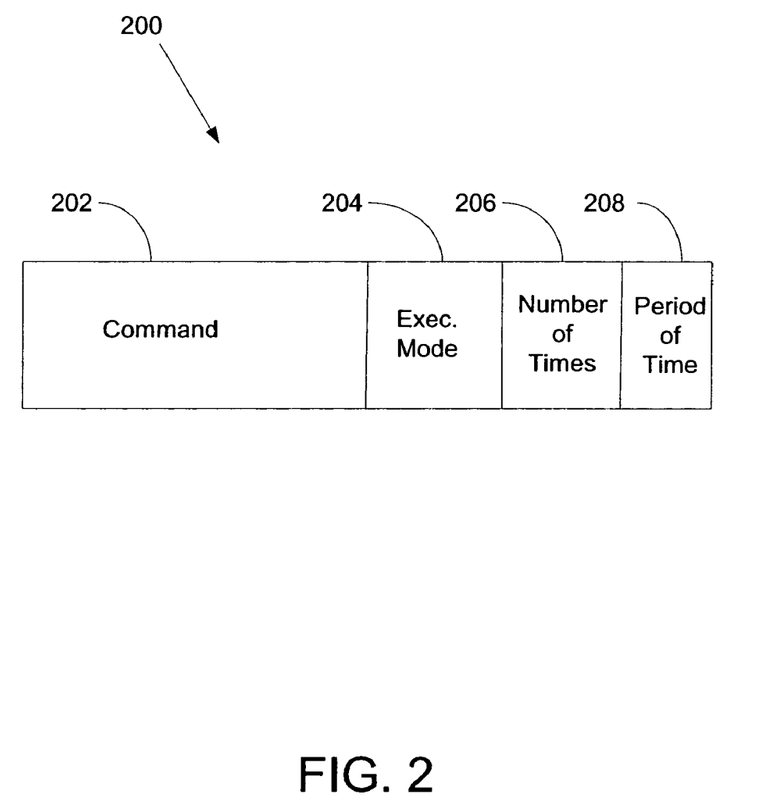
FIG. 2 is a block diagram of an instruction format according to an example embodiment.

FIG. 2 is a block diagram of an instruction format according to an example embodiment. As shown in FIG. 2, the instruction 200, which may be sent from host processor 102 to a co-processor 106, may include several fields. Some, but not necessarily all, of the fields of the instruction are shown in FIG. 2, according to an example embodiment. This merely represents some fields of an example instruction format, and many other formats may be used.

Instruction 200 (FIG. 2) may include a command field 202 that may provide a command to be performed or provides information about an operation the co-processor 102 is to perform. In addition, there may be one or more arguments provided within command field 204, for example.

Instruction 200 may also include an execution mode field 204 which may indicate a mode of execution for the instruction 200. As noted, the modes of execution for an instruction that may be specified by field 204 may include a regular (or single) mode and a repeat mode. Thus, in one example embodiment, in the case where only two modes are available, one bit may be used for the execution mode field 204, e.g., a zero (0) for this bit may indicate regular mode and a one (1) may indicate repeat mode, for example. Many other embodiments are possible as well. The instruction from host processor 102 may be executed (or performed) repeatedly or multiple times. This repeated execution may be performed a specific number of times, for a specific period of time, until a specific event occurs, or indefinitely, for example. Therefore, execution mode field 204 may include multiple bits to specify various modes such as, for example: regular (single) mode (000), repeat mode—number of times (100), repeat mode—period of time (101), repeat mode—indefinitely (110), etc.

Referring to FIG. 2 again, the instruction 200 may also include a field 206 to indicate a number of times the operation may (or should) be performed (or number of times the instruction may be executed) by co-processor 106 before waking or interrupting the host processor 102, and a field 208 that stores information about a period of time the co-processor 106 may (or should) perform the operation (or execute the instruction) before waking up the host processor 102.

Figure 3:
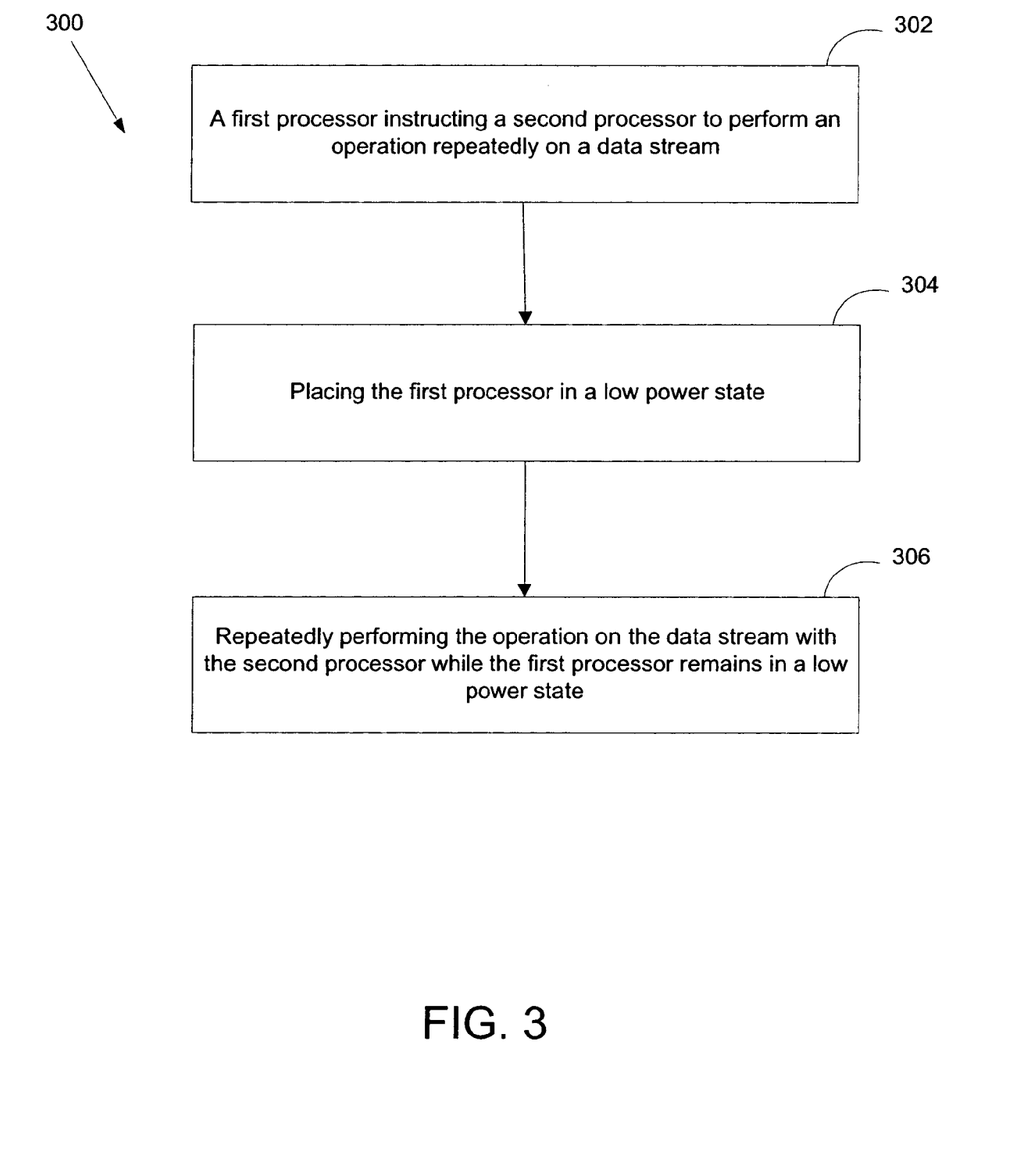
FIG. 3 is a flow chart 300 illustrating operation of computer system according to an example embodiment.

FIG. 3 is a flow chart 300 illustrating operation of computer system according to an example embodiment. At 302, a first processor (e.g., host processor 102) instructs a second processor (e.g., co-processor 106) to perform an operation repeatedly on a data stream. For example, a data frame may be received by host processor 102 or by peripheral 110 and stored in memory 108. The host processor 102 may then send an instruction to instruct co-processor 106 to repeatedly perform an operation, such as to repeatedly process data frames in memory 108 (e.g., as the frames are received). Thus, execution mode field 204 in instruction 200 (FIG. 2) may be set to repeat mode, and the instruction 200 may specify a number of times, or time period, indefinitely, etc. which the operation may be performed or repeated by co-processor 106 without further instructions from host processor 102. For example, as more data (e.g., another frame) is received by peripheral 110 and stored in memory 108, co-processor 106 may perform the requested operation again (repeatedly) without receiving further instructions from host processor 102, since the instruction 200 for co-processor 106 was set to repeat mode (e.g., which may place the co-processor 106 in a repeat mode of execution). The host processor, via the instruction 200, may also specify the type of data or data frames to be processed repeatedly, such as all data frames of a specific type (e.g., all Bluetooth data frames, or all Bluetooth data frames of a specific type such as HV3), data frames from a specific source or having a specific address or identifier, or associated with a specific connection or data flow, etc.

At 304 (FIG. 3), the first processor (e.g., host processor 102) is placed in a low power state (or sleep mode). At 306, the second processor (e.g., co-processor 106) repeatedly performs the operation on the data stream while the first processor remains in a low power state. The second processor (e.g., co-processor 106) may then interrupt or wake up the first processor (or host processor 102) when the number of times for repeating operation or the specified time period has been reached (e.g., as specified in the instruction), or an error has been detected, etc.

Figure 4:
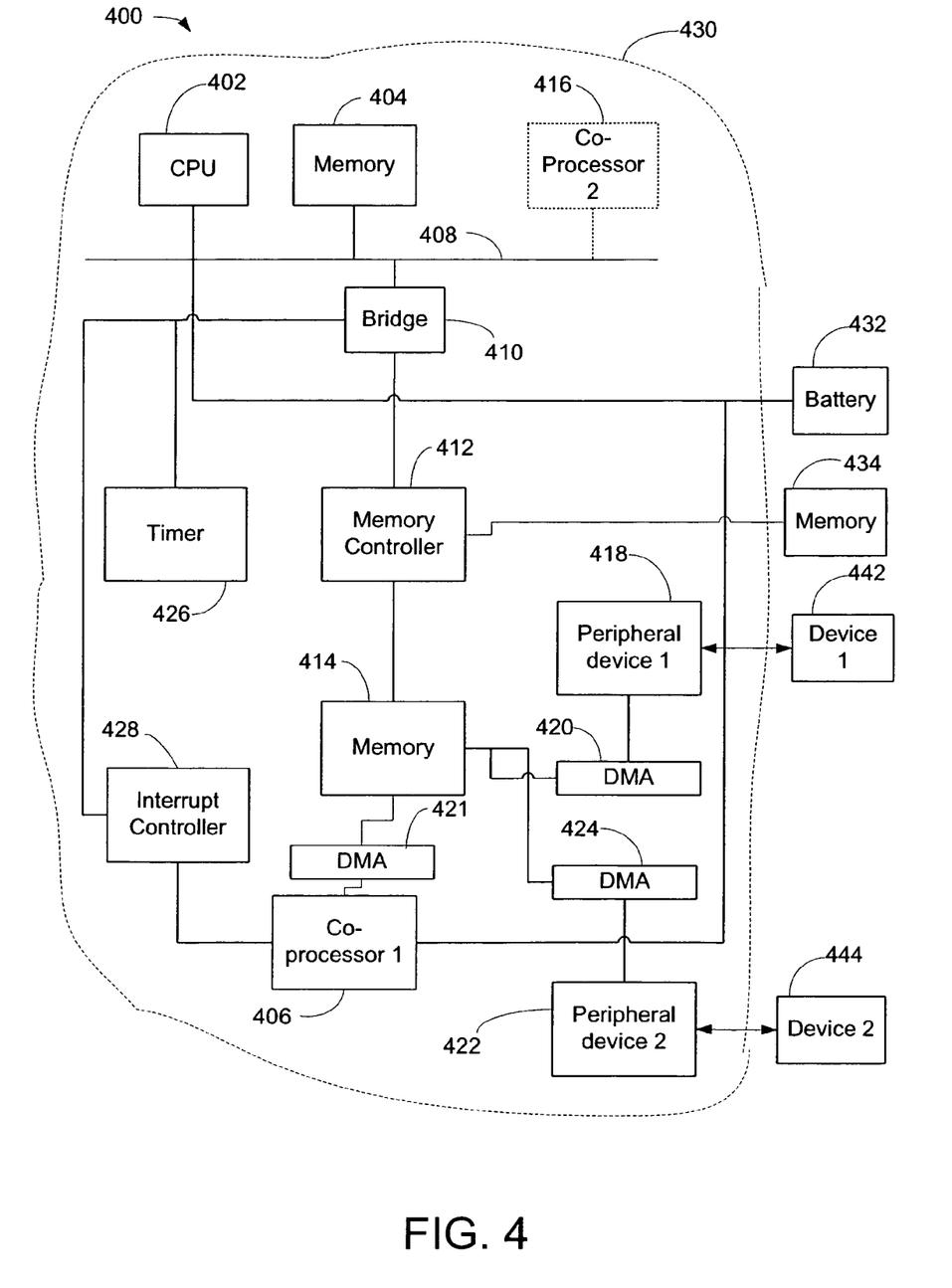
FIG. 4 is a block diagram of a computer system according to another example embodiment.

FIG. 4 is a block diagram of a computer system according to another example embodiment. Computer system 400 includes a first processor 402 (e.g., a host processor) which may be connected by a bus 408 to a memory 404 and to a bridge 410. The bridge 410 is connected to a memory controller 412, a timer 426, and an interrupt controller 428. The memory controller 412 is coupled to a memory 414, which may be a main system memory. The memory 404 may be a read-only memory (ROM) for storing a basic input and output system (BIOS) used to boot the computer system 400 or a fast random access memory (RAM) cache available to the host processor when performing operations on data. The memory 414 may be, for example, a synchronous RAM (SRAM) or other type of memory used temporarily to store data written by, or to be provided to, a processor in the computer system 400 that is performing operations on data. The memory controller 412 may control data read/write operations between the processor 402 and the memory 414. The computer system 400 includes a bus 408 for carrying data and addresses between the host processor 402 and the various components in computer system 400.

The computer system 400 may also include a second processor 406 and/or a third processor 416 for processing data. The second processor 406 and the third processor 416 may be co-processors adapted for performing one or more specific operations on data in an efficient manner, according to an example embodiment. For example, the co-processors 406 and 416 may be math co-processors adapted for performing arithmetic operations on data, or a co-processor adapted for coding and/or decoding data in a particular format (e.g., an MP3 co-processor for coding and/or decoding data in an MP3 format or a Bluetooth co-processor for coding/decoding data in a Bluetooth format). These are just a few examples, and the disclosure is not limited thereto. Many other types of co-processors may be used.

Although not required, according to an example embodiment, a DMA channel (or DMA device) may be connected to each co-processor to facilitate the transfer of data between the co-processor (406 and/or 416) and memory 414 and/or 404. For example, a DMA channel 421 may be connected to co-processor 406 to handle data transfers between co-processor 406 and memory 414, as shown in FIG. 4. Although not shown, a similar DMA channel may be connected to co-processor 416, according to another example embodiment.

In one implementation, the host processor 402 may be coupled to the co-processor 406 though a bridge 410, a memory controller 412, and a memory 414. In such an implementation, the host processor 402 is also coupled to the co-processor 406 through the bridge 410 and an interrupt controller 428. In another implementation, the host processor 402 may be coupled to a co-processor 416 directly though the host bus 408.

The computer system 400 may also include one or more peripheral devices 418 and 422 through which components of the computer system 400 may interface with one or more platform devices. For example, the peripheral device may be a Universal Serial Bus (USB) device (or interface) for transferring data to and from a platform device 442 or 444 using a USB protocol, or a Universal Asynchronous Receiver Transmitter (UART) device or interface for transferring data to and from a platform device 442 or 444 using a UART protocol, although many other types of peripherals or interfaces may be used. A direct memory access (DMA) device (or channel) 420 or 424 may couple a peripheral device, 418 or 422, respectively, directly to the memory 414. DMA devices 420 and 424 may transfer data directly between memory 414 and peripheral devices 418 and 42, respectively, without relying upon host processor 402 or memory controller 412 to handle such data transfer.

Components 402-428 of the computer system may all be located on a single chip 432, such that portions of the computer system 400 may be known as a system-on-a-chip (SOC), for example, although the system is not limited thereto. Components of the computer system 400, for example, the host processor 402 and the co-processors 406 and 416, may be powered by a battery 432. In an example embodiment, the entire system may be powered by battery 432. The SOC may also be coupled to an external memory 434 that may store instructions to be performed or executed by a processor 402, 406, or 416 of the SOC.

When the system 400 is powered-on, the host processor 402 may configure the peripheral devices 418 and 424 and their respective DMAs 420 and 424 for communication with external platform devices 442 and 444, for example. During operation of the computer system 400, the host processor 402 may obtain instruction from a memory 404, 414, or 434, and, in response to the instruction, the host processor 402 may instruct a co-processor 406 or 416 to perform an operation on data. For example, a data stream may be received by the computer system 400 from a platform device 442 through the peripheral device 418, and then a data type of the data in the data stream may be determined by the host processor 402 (e.g., the host processor 402 may determine that the incoming data stream contains MP3 type data), and then the host processor 402 may send an instruction to the co-processor 406 to perform an operation on the incoming data stream.

When the platform device 444 sends the data stream to the computer system, an interrupt request (IRQ) also may be generated by the platform devices 444 and transmitted to the computer system. The IRQ may be delivered from the platform device 444 either to the co-processor 406 or to the host processor 402 using the interrupt controller 428.

In response to a pending IRQ (e.g., requesting that a data stream of MP3 data be decoded and processed), the host processor 402 may, for example, instruct the co-processor 406 to decode a frame of the incoming MP3 data. While the co-processor 406 is performing the operation, power to the host processor 402 may be suspended, and the host processor may be placed in a low-power state, to conserve power and the energy stored in the battery 432, while the host processor is not performing operations. If the host processor 402 has enabled a regular (single) mode of execution for the operation, then when the co-processor 406 is finished with the operation it has been instructed to perform, it may send an IRQ to the host processor 402 through the interrupt controller 428 to wake up the host processor 402 and signal that it is finished processing the instruction from the host processor. Then, the host processor 402 again may begin its negotiation with platform device 444, again instructing the co-processor 406 to perform an operation on the incoming data stream, and again may go into its low-power state while the co-processor performs this operation.

To enhance power conservation in the computer system 400, the co-processor 406 may be instructed to perform an operation on data repeatedly while the host processor 402 remains in a low power state mode, thus obviating the need to wake up the host processor 402 each time the co-processor 406 performs a same operation or similar type of operation, according to an example embodiment. As noted above, the host processor 402 may instruct the co-processor 406 or 416 to perform an operation repeatedly, e.g., by enabling a repeat mode of execution via field 204 (FIG. 2) for the instruction or operation. Thus, when the data stream is received (e.g., from a platform device 442 or 444, or from a memory 404, 414, or 434, or from some other location), and the host processor 402 determines the operation that the co-processor 406 will be instructed to perform on the data, an instruction may be sent to the co-processor 406 to perform the operation repeatedly without additional instructions from the host processor 402. The instruction may instruct the co-processor 406 to perform the operation a certain number of times before waking up the host processor 402 from its low-power sleep mode, or may instruct the co-processor to perform the operation repeatedly as needed for a certain length of time (e.g., as determined by a timer 426) before waking up the host processor, or may simply instruct the co-processor 406 to repeat the operation indefinitely, in which case the co-processor 406 may perform the operation until an error is generated (e.g., because co-processor receives data for which the operation designated by the host processor 402 for the co-processor 406 to perform is invalid) and then wake up the host processor 402, for example.

Also, the co-processor 406 (and/or 416) may also enter a low-power state to conserve power if it is not being utilized. For example, if the co-processor 406 does not process any data for more than a predetermined amount of time, the co-processor 406 may enter a low power state. In addition, peripheral devices 418 and/or 422 and/or platform devices 442 and 444 may provide a no activity signal (e.g., indicating no signals or activity are detected or have been transmitted or received) to the co-processor 406 or 416, in response to which the co-processor 406 may enter a low-power state. For example, some types of peripheral devices (418) may detect silence or lack of incoming audio signals (e.g., for voice applications). In response to detecting such silence, the peripheral device may provide a "no activity" signal to co-processor 406 or 416 to allow these co-processors to enter a low power state. Then, when the platform device 444 is prepared to resume transmitting the data stream for processing by the co-processor 406, the platform device may first send an early valid signal or wake up signal (indicating that data may be expected or has been detected) to instruct the co-processor to wake up from its low-power state, e.g., so that the co-processor 406 may be ready to process data when the data stream resumes. Or, in the case of the example audio peripheral that detected silence and sent the no activity signal, when the peripheral device detects incoming voice or audio signals (e.g., received from a platform device or other device), then the peripheral device may provide an early valid or wake up signal to the co-processor 406.

Figure 5:
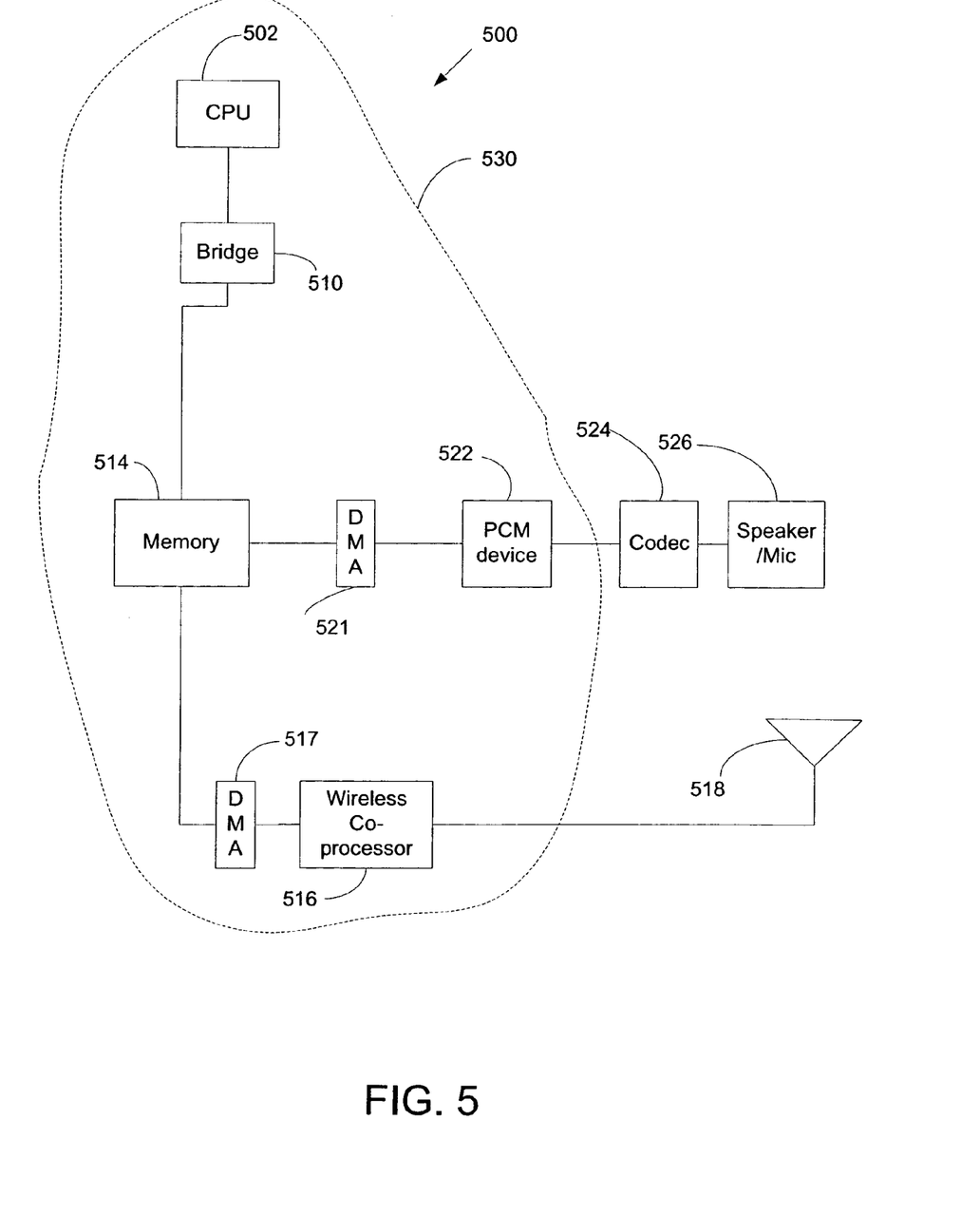
FIG. 5 is a block diagram of a computer system according to another example embodiment.

FIG. 5 is a block diagram of a computer system according to another example embodiment. A computer system 500 may include a host processor 502, a bridge 510 coupled between the host processor 502 and a memory 514, and a DMA device 521 coupled to a pulse coded modulation (PCM) (peripheral) device 522. PCM device 522 may perform pulse coded modulation and demodulation. A coder/decoder (codec) 524 and a speaker and microphone 526 (platform device) may be coupled to PCM device 522. An antenna 518 may transmit and receive wireless or radio signals. Antenna 518 is coupled to a wireless co-processor 516. A DMA device 517 may provided between wireless co-processor 516 and memory 514. The platform device 526 (e.g., a speaker/mic) may be located outside the components of the computer system 500 that are located on a single chip 530 as a SOC, and the platform device 526 may render data that are processed by the SOC.

Referring to FIG. 5, an example implementation of the computer system 500 may be, for example, for receiving and transmitting Bluetooth encoded data (for example, to/from a Bluetooth headset) via wireless link through the antenna 518. The received Bluetooth encoded data (received at antenna 518 via wireless link) may be decoded by wireless (e.g., Bluetooth) co-processor 516 and this decoded data may be stored in memory 514 via DMA 517. DMA 521 may transfer Bluetooth decoded data to PCM device 522 to be pulse coded demodulated, processed (e.g., decoded) by codec 524 and then output to speaker 526 for output or rendering as audio signals, for example.

In FIG. 5, in the opposite direction signal path, audio signals may be generated and provided by microphone 526 and coded by codec 524. PCM device 522 may then pulse code modulate the audio signals and this information may be stored in memory 514. Wireless co-processor 516 may Bluetooth encode the data and output this encoded data for wireless transmission via antenna 518.

According to an example embodiment, host processor 502 may configure both DMAs 517 and 521, and may then configure co-processor 516. Host processor 502 may instruct wireless co-processor 516 to repeatedly decode Bluetooth data frames as they are received. This may be done, for example, by host processor 102 enabling a repeat mode of instruction execution using execution mode field 204 in instruction 200, for example. Thus, one instruction may be sent from host processor 502 to wireless co-processor 516 to instruct the wireless co-processor to repeatedly decode received Bluetooth encoded data frames, and Bluetooth encode data frames for transmission (depending on the direction), without further instructions from host processor 502 and without waking host processor 502, for example. Host processor 502 may then be placed in a low power state, e.g., until the co-processor has performed the requested operation the specified number of times or for the specified period of time, until an error condition is detected, etc., at such time the co-processor 516 may wake or interrupt host processor 502, for example.

According to an example embodiment, host processor 502 may send a Bluetooth processing instruction to co-processor 516, such as a master SCO instruction or a slave SCO instruction, and specifying (e.g., either separately or via a field in the instruction such as an execution mode field 204) that the instruction may be executed or performed repeatedly or multiple times without further instruction from host processor 502. Host processor 502 may even, in one example embodiment, specify that Bluetooth encoded packets of a specific type, such as HV3 packets, may be decoded indefinitely, for example. There are many different Bluetooth packet types, and may be based upon negotiated data rate, and other parameters. However, the disclosure is not limited thereto, and this is merely another example embodiment.

Figure 6:
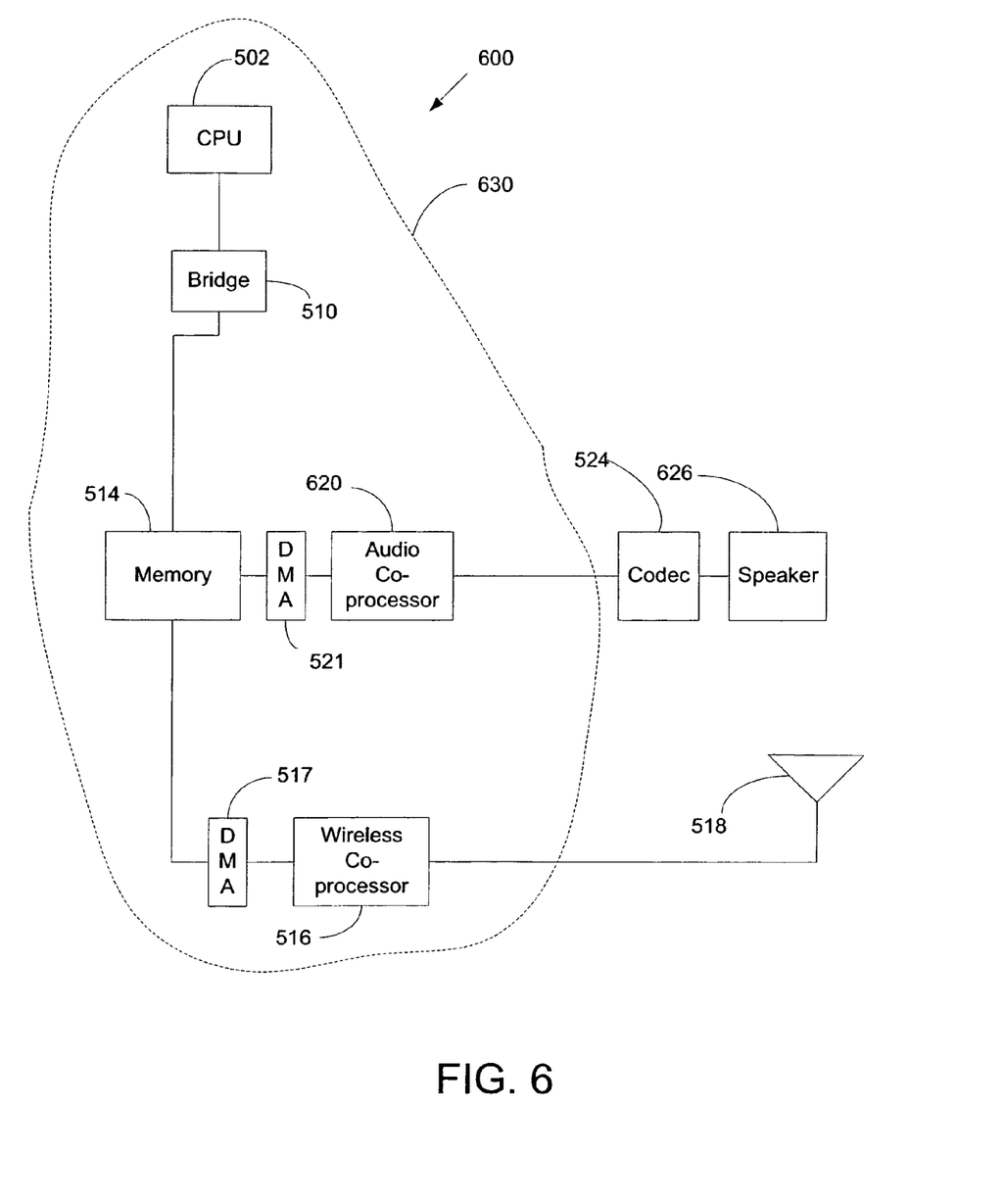
FIG. 6 is a block diagram of a computer system according to yet another example embodiment.

FIG. 6 is a block diagram of a computer system according to yet another example embodiment. The computer system 600 illustrated in FIG. 6 is very similar to the computer system 500 in FIG. 5, but has a few differences. A speaker 626 is provided for rendering or outputting audio signals. Also, instead of a PCM device, an audio co-processor 620 is provided, which may be, for example, an MP3 co-processor for decoding MP3 encoded signals. The platform device 626 (e.g., speaker) may be located outside the components of the computer system 600 that are located on a single chip 630 as a SOC, for example.

The system 600, for example, may receive and process Bluetooth encoded MP3 signals, and then output or render these signals via speaker 626. To facilitate this processing while decreasing the supervision or intervention required by host processor 502, processor 502 may send an instruction to instruct wireless co-processor (e.g., Bluetooth co-processor) 516 to repeatedly decode received Bluetooth encoded data frames (e.g., in the data stream), and output this decoded information to memory 514. Host processor 502 may also send an instruction to audio co-processor (e.g., MP3 co-processor) 620 to repeatedly decode MP3 signals received from memory 514 (e.g., received via DMA 521), and output these decoded signals to codec 524. The host processor 502 may then enter a low power state while both the wireless co-processor 516 and audio co-processor 620 repeatedly perform their requested operations on received data.

Figure 7:
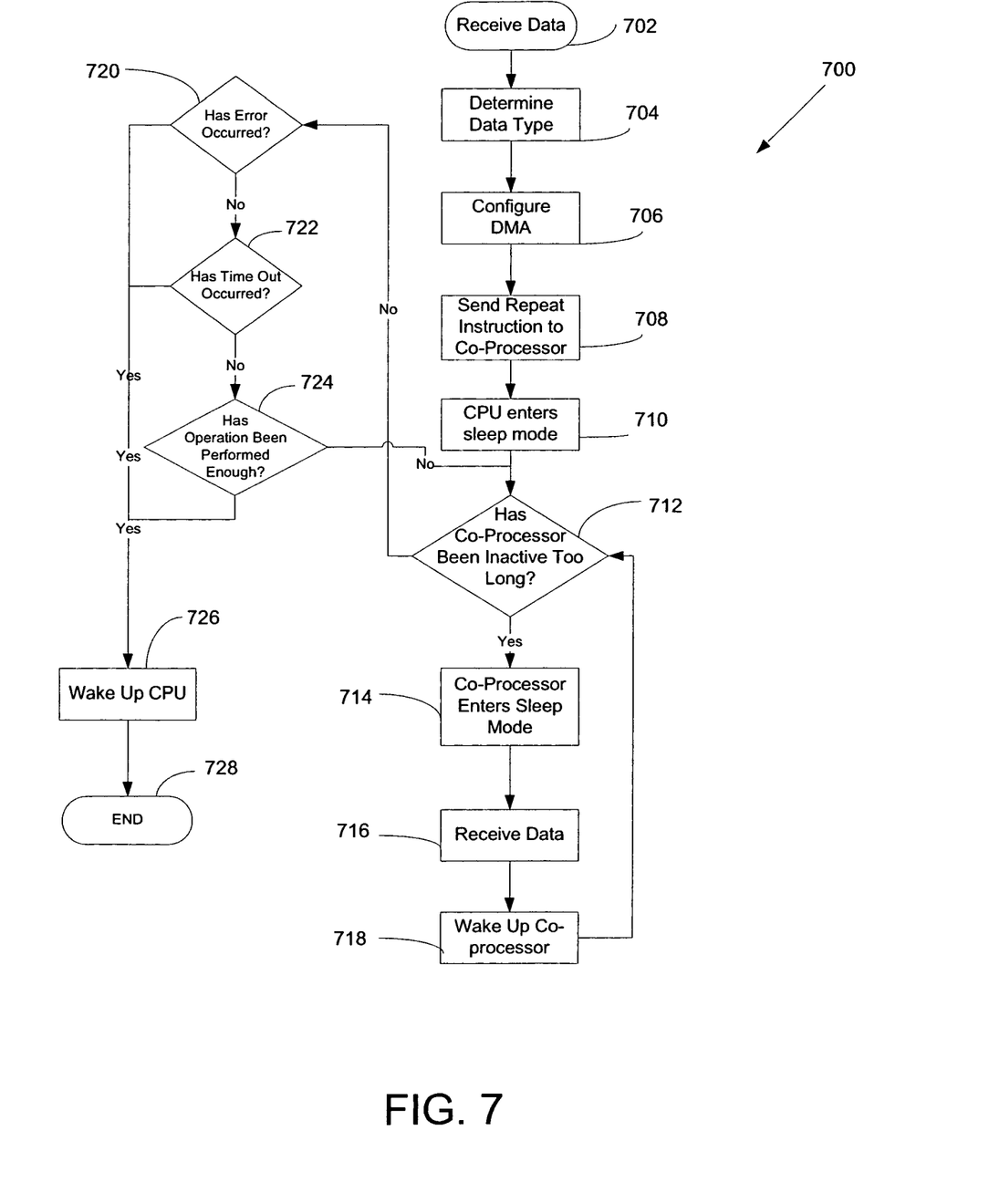
FIG. 7 is a flow chart 700 illustrating operation of computer system according to another example embodiment.

FIG. 7 is a flow chart 700 illustrating operation of computer system according to another example embodiment. Data may be initially received (702). A data type of the received data is determined (704), and, if not already configured, one or more direct memory access channels or devices may be configured for providing direct communication between one or more platform devices and a memory in the computer system (706). An instruction may be sent by a host processor to a co-processor to perform repeatedly an operation on data (708), which may involve sending an instruction with the repeat mode enabled for the execution mode field 204 (FIG. 2), for example. The host processor may then enter a low-power state or sleep mode (710).

The co-processor may continue to perform the operations (repeatedly) on the data while the host processor is in the low-power state. If the co-processor is inactive for longer than a predetermined amount of time (712), then the co-processor may enter a low-power state or sleep mode (714). While the co-processor is in the low-power sleep mode, data may be received (716), and the received data may include an "early valid" or wake up signal to the co-processor to wake up from its sleep mode (718) so that the co-processor is again ready to perform the operation on the incoming data stream. After the co-processor is awake again, it may again be determined whether co-processor has been inactive for longer than a predetermined amount of time (712).

If the co-processor has not been inactive for longer than a predetermined amount of time (712), then it may be determined whether an error has occurred in the processing of data by the co-processor (720), whether the co-processor has performed the operation for more than a predetermined amount of time (722), or whether the operation has been performed for more than a predetermined number of times (724). If any of these queries yield a positive result, then the host processor is awakened (726), and the process 700 ends (728). Otherwise, the co-processor continues to perform the operation on the data stream while the host processor remains in a low-power state or sleep mode, and the process 700 returns to 712.

A number of implementations have been described. Nevertheless, it will be understood that various modifications may be made. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of processing data in a computer system having a first processor and a second processor, the method comprising:
    sending an instruction to the second processor to perform an operation on a data stream, wherein the instruction includes a command field and an execution mode field, a value of the execution mode field specifying one of a plurality of modes of execution including a regular mode indicating the instruction should be executed by the second processor once before awaking the first processor from a low power sleep mode, and a repeat mode indicating that the instruction should be executed repeatedly without further instructions from the first processor;
    placing the first processor in a low power state; and
    performing the operation on the data stream with the second processor once or repeated based on the value of the execution mode field while the first processor remains in the low-power sleep mode.

2. The method of claim 1, further comprising:
    receiving an error signal generated by the second processor; and
    waking up the first processor in response to the error signal.

3. The method of claim 2, wherein the error signal is generated in response to inactivity by the second processor for a time period greater than a predetermined time period.

4. The method of claim 1, further comprising waking up the first processor after a predetermined time period has elapsed after the first processor has entered the low-power sleep mode.

5. The method of claim 1, wherein said instructing comprises instructing the second processor to perform the operation repeatedly on the data stream for a predetermined number of times and, after the operation has been performed for the predetermined number of times, to send a signal to the first processor to wake up the first processor.

6. The method of claim 1, further comprising receiving the data stream from a wireless communications link.

7. The method of claim 1, further comprising receiving a signal from a peripheral device at the second processor to wake up the second processor from a low power state, wherein the signal is received while the first processor is in the low power state.

8. The method of claim 1, further comprising configuring a direct memory access channel for communication between the second processor and a memory.

9. The method of claim 1, further comprising:
    determining a data type of the data stream; and
    selecting the operation for the second processor to perform on the data stream based on the data type.

10. A method comprising:
    receiving an instruction at a second processor from a first processor, the instruction including a command field and an execution mode field, a value of the execution mode field specifying one of a plurality of modes of execution including a regular mode indicating the instruction should be executed by the second processor once before awaking the first processor from a low power sleep mode, and a repeat mode indicating that the instruction should be executed repeatedly without further instructions from the first processor; and
    executing the instruction by the second processor once or repeated based on the value of the execution mode field.

11. A computer system comprising:
    a memory;
    a first processor; and
    a second processor,
    wherein the first processor is configured to send an instruction to the second processor to perform an operation on a data stream, wherein the instruction includes a command field and an execution mode field, a value of the execution mode field specifying one of a plurality of modes of execution including a regular mode indicating the instruction should be executed by the second processor once before awaking the first processor from a low power sleep mode, and a repeat mode indicating that the instruction should be executed repeatedly without further instructions from the first processor,
    and wherein the first processor is configured to enter a low power state after instructing the second processor to perform repeatedly the operation,
    and wherein the second processor is configured to, based on the value of the execution mode field, perform the operation on the data stream once or repeatedly while the first processor remains in the low-power sleep mode.

12. The computer system of claim 11 wherein the first processor comprises a host processor and the second processor comprises a co-processor.

13. The computer system of claim 11, further comprising a direct memory access device coupled to the second processor.

14. The computer system of claim 11, wherein the first processor is a central processing unit and the second processor is a co-processor.

15. The computer system of claim 11, further comprising a memory device adapted and configured to store instructions for instructing the first processor to send the instruction to the second processor.

16. The computer system of claim 11, wherein the second processor is adapted to send a signal to the first processor to wake up the first processor.

17. The computer system of claim 16, wherein the second processor is adapted to send the signal to the first processor after the second processor has performed the operation a predetermined number of times.

18. The computer system of claim 16 wherein the second processor is adapted to send the signal to the first processor when performance of the operation by the second processor generates an error.

19. The computer system of claim 16, wherein the second processor is adapted to enter a low power state upon no activity while the first processor is in a low power state; and wherein, while the first processor remains in a low power state, the second processor is adapted to awaken from its low power state upon receipt of a wake up signal from a peripheral device.

* * * * *